Patented Dec. 5, 1950

2,532,403

UNITED STATES PATENT OFFICE 2,532,403

PYROGEN REMOVAL FROM STREPTOMYCIN SALTS

Eugene E. Howe, Linden, and Max Tishler, Rahway, N. J., assignors to Merck & Co., Inc., Rahway, N. J., a corporation of New Jersey No Drawing. Application November 8, 1946, Serial No. 708,818

5 Claims. (Cl. 260—210)

This invention relates to the removal of pyrogens from therapeutic preparations and particularly to a process for the removal of pyrogens from solutions of streptomycin to obtain solutions suitable for parenteral use.

The physiological reactions caused by the presence of pyrogens in therapeutic preparations are particularly objectionable in the treatment of severe infection or disease because the patient receiving treatment is often so weakened by the infection that these reactions will prevent or greatly hinder recovery. Streptomycin has been demonstrated to be a very powerful drug for combating stubborn infections and diseases, but one of the factors hindering its more extended use has been the difficulty in keeping the pyrogen content of streptomycin preparations sufficiently low to prevent objectionable reactions.

Attempts have been made to remove pyrogens from streptomycin by contacting with glass wool, filtering through ertel discs (asbestos fibers), or by prolonged contact with shredded ertel discs. These procedures, however, have little or no effect in reducing the pyrogen content of streptomycin preparations.

It is now discovered, in accordance with the present invention, that pyrogens can be effectively removed from acid salts of streptomycin, such as streptomycin hydrochloride, streptomycin sulfate, and the like, in aqueous solution by treatment with powdered charcoal such as "Darco G–60" or other commercially available charcoals. At the same time, some improvement in purity is obtained in this process. It is surprising and unexpected that powdered charcoal could be used for this purpose in view of the fact that streptomycin itself is so readily adsorbed upon charcoal as, for example, in the original recovery of streptomycin from culture broth containing the same (Schatz, Bugie, and Waksman, Proceedings of the Society for Experimental Biology and Medicine, 55, 66–69 (1944)). It is found, however, that upon treatment of an aqueous solution of an acid salt of streptomycin with charcoal, very little of the streptomycin is adsorbed on the charcoal. This is apparently due to the slight acidity of the acid salts such as streptomycin hydrochloride, streptomycin sulfate, and the like in aqueous solution. It should be noted that the small amount of streptomycin which is adsorbed is not lost, but can be recovered from the charcoal by elution with alcoholic acid, or better, the streptomycin can be almost completely removed from the charcoal by slurrying with water. The aqueous streptomycin solution thus recovered can be processed by itself or can be used to dissolve another batch for pyrogen treatment.

In carrying out the process of the present invention, aqueous solutions containing as much as about 25% of an acid salt of streptomycin can be employed although it is preferable to use more dilute solutions, i. e., solutions containing 2 to 10% of streptomycin acid salt. These solutions can be either solutions obtained in usual purification procedures or solutions prepared by dissolving solid streptomycin acid salt in water, preferably pyrogen-free.

For removing pyrogens from such solutions an amount of powdered charcoal such as "Darco G–60" or the like, equal to about 12 to 50% by weight, based upon the weight of streptomycin acid salt, is added to the solution and the mixture is agitated for about one hour. The mixture is then filtered to remove the charcoal, preferably using a filter cloth to facilitate recovery of the charcoal for re-slurring. After filtration, the charcoal is returned to the original container, slurried with pyrogen-free water equal in volume to about 10% of the volume of the original solution treated. This mixture is then filtered as before and the filtrate is combined with the original filtrate. (The washing of the charcoal can also be done in the filter instead of by removal and re-slurrying, if desired.) The charcoal can be again washed or re-slurried, if desired, to further reduce the amount of streptomycin remaining on the charcoal, and after the final filtration, the charcoal is set aside for recovery of the residual adsorbed streptomycin. (All the ceramic- and glassware used in the filtrations, and in collecting and handling the filtrates should be made pyrogen-free by heating to 250° C. for one hour.) The combined filtrates are then sterilized by filtration through a Seitz filter, and then dried, preferably by freezing and drying from the frozen state under vacuum.

The amount of charcoal to be used varies with the concentration of the streptomycin solution, 10 to 12% of charcoal generally being sufficient with a 2% solution of streptomycin acid salt, and about 25 to 50% of charcoal being required with a 25% solution of streptomycin acid salt. It is to be understood, however, that different lots of streptomycin vary considerably in pyrogen content and that in some instances the optimum amount of charcoal may fall outside the ranges above mentioned.

The time of contact of the streptomycin solution with charcoal is relatively critical. If the time of contact is appreciably less than an hour, assuming the proper amount of charcoal is used, the pyrogens are not completely adsorbed, and prolonging the time of contact appreciably beyond one hour has not been found to be of any advantage.

The removal of pyrogens appears to proceed well with untreated charcoal, preheated charcoal, or acid-washed charcoal, although there is believed to be a slight advantage in using charcoal which has been preheated to 250° C. for about eight hours.

The following examples show how the process of the present invention is carried out, but it is to be understood that these examples are given by way of illustration and not of limitation.

Example I 3425 g. of pyrogenic streptomycin hydrochloride, containing 787 million units of streptomycin, was dissolved in 11.5 liters of pyrogen-free water and to this (approximately 23% of solution) was added 1700 g. (approximately 50% based upon weight of streptomycin hydrochloride) of powdered charcoal, preheated for eight hours at 250° C. The mixture was agitated for one hour and then filtered through a 10-inch Büchner funnel into a five gallon pyrex bottle. (All glassware was made pyrogen-free by heating for one hour at 250° C.) The charcoal was washed with two 1.5 liter portions of pyrogen-free water, which were combined with the main filtrate. The charcoal was then washed with about three to four gallons of water and this wash was worked up separately.

The combined filtrates were then sterilized by filtration through a Seitz pad S-1, frozen, and dried from the frozen state under vacuum. The resulting dry streptomycin hydrochloride passed the U. S. P. pyrogen test at 10,000 u./kg.

The aqueous streptomycin hydrochloride recovered as washes can be used to dissolve another batch for pyrogen treatment.

Generally, the direct recovery of streptomycin hydrochloride is about 85% and the water washes contain about 10 to 12%. The latter of course is recovered by recycling or by working up separately.

Example II

Three batches of streptomycin hydrochloride of different concentration were treated with charcoal, preheated for eight hours at 250° C., in the amounts shown in the table below, by mechanically stirring the charcoal suspension for one hour. The suspensions were then each filtered through a Büchner funnel using coarse filter paper over which a cloth was placed to facilitate removal of the charcoal for re-slurrying. (All glass- and ceramic-ware was made pyrogen-free by heating to 250° C. for one hour.) After each filtration, the charcoal was returned from the funnel to the original container and slurried with pyrogen-free water, equal in volume to 10% of the volume of the original solution, and again filtered. The charcoal for each batch was re-slurried twice more as above described, and the original and three re-slurry filtrates from each batch were combined, and the charcoal set aside for recovery of residual adsorbed streptomycin.

The combined filtrates from each batch were sterilized by Seitz filtration, frozen, and dried from the frozen state under vacuum, yielding streptomycin hydrochloride which passed the U. S. P. pyrogen test at 10,000 u./kg.

Aliquots of each batch before charcoal treatment and after charcoal treatment were dried, weighed, and assayed, yielding data which is included in the following table. (Concerning the activity changes, it is to be noted that it is difficult to evaluate changes of 10% or less by microbial assay except statistically on a large number of batches.)

Table

| Item | Batch | | |
|---|---|---|---|
| | A | B | C |
| Conc. of solution treated | 5% | 10% | 20% |
| Weight streptomycin hydrochloride before charcoal treatment | 72.0 g | 1,230 g | 1,375 g. |
| Charcoal used (weight) | 10.8 g | 246 g | 344 g. |
| Charcoal used (per cent based on dry streptomycin hydrochloride) | 15% | 20% | 25% |
| Weight of pyrogen-free streptomycin hydrochloride recovered directly | 66.2 g | 1,105 g | 1,275 g. |
| Weight loss | 5.8 g.=8% | 125 g.=10% | 100 g.=7% |
| Activity before charcoal treatment (units/mg.) | 407 | 327 | 371 |
| Activity of pyrogen-free product (units/mg.) | 420 | 354 | 354 |
| Pyrogenicity [1] | Passes [1] | Passes [1] | Passes [1] |

[1] U. S. P. standard test for pyrogens.

While the foregoing examples show the removal of pyrogen from streptomycin hydrochloride, it will be understood that pyrogens are removed from other streptomycin acid salts in the same manner by following the procedure described therein.

Modifications may be made in carrying out the present invention without departing from the spirit and scope thereof, and the invention is to be limited only by the appended claims.

We claim:

1. The process that comprises adding powdered charcoal to an aqueous solution of a pyrogenic streptomycin acid salt, agitating the mixture for about one hour, and filtering off the charcoal, thereby recovering a solution of the streptomycin acid salt free of pyrogens.

2. The process that comprises adding powdered charcoal, preheated for about eight hours at 250° C., to an aqueous solution of a pyrogenic streptomycin acid salt, agitating the mixture for about one hour, and filtering off the charcoal, thereby recovering a solution of the streptomycin acid salt free of pyrogens.

3. The process that comprises adding to an aqueous solution of a pyrogenic streptomycin acid salt, having a concentration of about 2 to 25%, an amount of powdered charcoal equal to 10 to 50% of the weight of streptomycin acid salt in said solution, the higher percentage of charcoal being used with the higher concentration of said solution, agitating the mixture for about one hour, and filtering off the charcoal, thereby recovering a solution of the streptomycin acid salt free of pyrogens.

4. The process that comprises adding to an aqueous solution of a pyrogenic streptomycin acid salt, having a concentration of about 2 to 25%, an amount of powdered charcoal, based upon the weight of streptomycin acid salt in said solution, varying from about 10 to 12% with a 2% solution to about 25 to 50% with a 25% solution, agitating the mixture for about one hour, and filtering off the charcoal, thereby recovering a solution of the streptomycin acid salt free of pyrogens, 5. The process that comprises adding powdered charcoal to an aqueous solution of a pyrogenic streptomycin acid salt, agitating the mixture for about one hour, filtering off the charcoal, re-slurrying and filtering the charcoal one to three times with volumes of pyrogen-free water equal to about 10% of the volume of the original solution, freezing the combined filtrates and drying from the frozen state under vacuum, thereby recovering the streptomycin acid salt free of pyrogens.

EUGENE E. HOWE.
MAX TISHLER.

REFERENCES CITED

The following references are of record in the file of this patent:

UNITED STATES PATENTS

| Number | Name | Date |
|---|---|---|
| 2,446,102 | Peck | July 27, 1948 |

OTHER REFERENCES

Carter et al.: Jour. Biol. Chem., vol. 160, pp. 337–342, Sept. 1945.

Le Page et al.: Jour. Biol. Chem., vol 162, pp. 163–171, 1946 (9 pages).

Mueller: JACS, vol. 69, (1947), pp. 195–200 (6 pages).